(12) United States Patent
Kuwayama

(10) Patent No.: US 6,999,387 B2
(45) Date of Patent: Feb. 14, 2006

(54) DISK REPRODUCING APPARATUS AND DISK TYPE IDENTIFYING METHOD

(75) Inventor: Yasunori Kuwayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 407 days.

(21) Appl. No.: 10/458,292

(22) Filed: Jun. 11, 2003

(65) Prior Publication Data

US 2003/0231565 A1   Dec. 18, 2003

(30) Foreign Application Priority Data

Jun. 13, 2002   (JP) .......................... P2002-172904

(51) Int. Cl.
*G11B 7/00* (2006.01)
*G11B 5/09* (2006.01)

(52) U.S. Cl. .............................. 369/44.23; 369/44.28; 369/44.41; 369/44.37; 369/53.2; 369/55.23; 369/53.1

(58) Field of Classification Search ................... None
See application file for complete search history.

(56) References Cited

U.S. PATENT DOCUMENTS 5,088,078 A * 2/1992 Moriwaki et al. ....... 369/44.25
6,314,064 B1 * 11/2001 Ueda et al. ............. 369/44.23
6,721,242 B1 * 4/2004 Ohnishi et al. .......... 369/44.26

FOREIGN PATENT DOCUMENTS

JP   2001-351315   12/2001

* cited by examiner

*Primary Examiner*—Muhammad Edun
(74) *Attorney, Agent, or Firm*—Morgan Lewis & Bockius LLP

(57) ABSTRACT

With a CD laser, a focusing search is carried out to detect a value CD-FE(pp) which is a difference between a maximum value and a minimum value of a focusing error signal, and to detect a value CD-AS which is a maximum value of a full-added signal. With a DVD laser, the focusing search is carried out to detect a value DVD-FE(pp) which is a difference between a maximum value and a minimum value of the focusing error signal, and to detect a value DVD-AS which is the maximum value of a full-added signal. The value that DVD-FE(pp) is divided by DVD-AS(max), is divided by the value that CD-FE(pp) is divided by CD-AS (max). According to whether the computed result by division is larger or not than a threshold value, it is determined whether the disk 100 is of a CD standard or of a DVD standard.

6 Claims, 3 Drawing Sheets

DISK REPRODUCING APPARATUS AND DISK TYPE IDENTIFYING METHOD

BACKGROUND OF THE INVENTION

1. Field of the Invention

The present invention relates to a disk reproducing apparatus for reproducing a disk, which is a disc-shaped recording medium, and more particularly to the disk reproducing apparatus for reproducing a CD standard disk and a DVD standard disk and a disk type identifying method.

2. Description of the Related Art

With an increase of the variety of disk types, a disk reproducing apparatus capable of reproducing a plurality of types of disks has been provided. In the disk reproducing apparatus, different kinds of parameters are employed during a reproducing operation according to the types of the disks. Therefore, the types of the disks to be reproduced must be identified and the parameters must be set according to the identified result. A publication of JP-A-2001-351315 discloses an example of a method for discriminating between a CD standard disk and a DVD standard disk in a system including two lasers each for CD and DVD.

In accordance with the method, as indicated in S7 and S8 in FIG. 3 of the above publication, it is identified whether the disk is a CD standard disk (exclusive of CD-RW) on the basis of a peak/peak value (CDFEpp) of a focusing error signal when a focus searching is being performed by turning on a CD laser.

Meanwhile, since there are variations in a reflection coefficient of the disk and in a power from the laser, there are also variations in a level of a focus error signal created on the basis of a reflection light from the disk. Therefore, the method disclosed in the publication may erroneously discriminate the type of the disk.

Further, in order to identify the disk type, the method described above requires three values of a peak/peak value of a focusing error signal, a maximum value of the DC component of an RF signal and a maximum value of the AC component of the RF signal. Hence, a problem occurs that the method described above cannot quickly and simply identify the disk type.

SUMMARY OF THE INVENTION

It is therefore an object of the invention to provide a disk reproducing apparatus and a disk type identifying method that can identify a type of a disk accurately, quickly and easily.

In order to achieve the above object, according to a first aspect of the invention, there is provided a disk reproducing apparatus for reproducing information recorded in a disk, which is a disc-shaped recording medium, including: a first laser source adapted to output a first laser beam for reproducing a disk of a first standard; a second laser source adapted to output a second laser beam for reproducing a disk of a second standard; a optical pick-up adapted to apply the first laser beam to the disk by turning on the first laser source when the disk is of the first standard disk, and to apply the second laser beam to the disk by turning on the second laser source if the disk is of the second standard, and to convert a reflected light acquired from the disk into an electric signal to read information recorded in the disk; a focusing error signal creating section adapted to create, on the basis of the electric signal, a focusing error signal indicative of a deviation of a beam spot applied to the disk from a recording face of the disk; a full-added signal creating section adapted to create a full-added signal which is a low frequency component of a signal obtained by adding all the electric signals acquired by the optical pick-up; a focus searching section adapted to carry out focusing search of moving the beam spot applied to the disk from the pick-up in a direction vertical to the recording face of the disk; a first detecting section adapted to detect a difference CD-FE(pp) between the maximum value and minimum value of the focusing error signal, and a maximum value CD-AS(max) of the full-added signal, when the focusing search is carried out with the first laser beam; a second detecting section adapted to detect a difference DVD-FE(pp) between the maximum value and minimum value of the focusing error signal, and a maximum value DVD-AS(max) of the full-added signal, when the focusing search is carried out with the first laser beam; a computing section adapted to compute a value $\{\{DVD\text{-}FE(pp)/DVD\text{-}AS(max)\}/\{CD\text{-}FE(pp)/CD\text{-}AS(max)\}\}$, which is a value obtained when the value obtained by dividing DVD-FE(pp) by DVD-AS(max) is divided by the value obtained by dividing CD-FE(pp) by CD-AS(max); a first determining section adapted to determine whether the disk is of the first standard or of the second standard according to whether or not the value $\{\{DVD\text{-}FE(pp)/DVD\text{-}AS(max)\}/\{CD\text{-}FE(pp)/CD\text{-}AS(max)\}\}$ is larger than a first threshold value; a second determining section adapted to determine, when the disk is determined to be of the first standard, whether the disk is a high reflection disk or a low reflection disk according to whether the value CD-AS(max) is larger than a second threshold value; and a third determining section adapted to determine, when the disk is determined to be of the second standard, whether the disk is a high reflection disk or a low reflection disk according to whether the value DVD-AS(max) is larger than a third threshold value.

In order to achieve the object, according to a second aspect of the invention, there is provided a method of identifying the type of a disk, which is a disc-shaped recording medium, including: carrying out a focusing search, which an operation to move a beam spot applied to the disk in a direction vertical to the recording face of the disk, with a first laser beam for reproducing a disk of a first standard, and detecting a value CD-FE corresponding to an amplitude of a focusing error signal indicative of a deviation of the beam spot from the reproducing face of the disk, and a value CD-AS corresponding to an amplitude of a full-added signal, which is a low frequency component of a signal obtained by adding all electric signals acquired by an optical pick-up; carrying out the focusing search with a second laser beam for reproducing a disk of a second standard, and detecting a value DVD-FE corresponding to the amplitude of the focusing error signal, and a value DVD-AS corresponding to the amplitude of the full-added signal; computing a CD-FE·AS ratio which is a ratio between the value CD-FE and the value CD-AS, a DVD-FE·AS ratio which is a ratio between the value DVD-FE and the value DVD-AS, and a CD·DVD-FE·AS ratio which is a ratio between the CD-FE·AS ratio and the DVD-FE·AS ratio; and discriminating whether the disk is of the first standard or of the second standard on the basis of the CD·DVD-FE·AS ratio.

In the method of identifying the type of the disk, for example, the value CD-FE may be a difference between the maximum value and the minimum value of the focusing error signal while the focusing search is carried out with the first laser beam, and the value CD-AS may be a maximum value of the full-added signal while the focusing search is carried out with the first laser beam, wherein the value DVD-FE may be a difference between the maximum value and minimum value of the focusing error signal while the focusing search is carried out with the second laser beam, and the value DVD-AS is a maximum value of the full-added signal while the focusing search is carried out with the second laser beam.

Additionally, the method of identifying the type of a disk may further include: discriminating, when the disk is identified to be of the first standard, whether the disk is a high reflection type disk or a low reflection type disk on the basis of the value CD-AS; and discriminating, when the disk is identified to be of the second standard, whether the disk is a high reflection type disk or a low reflection type disk on the basis of the value DVD-AS.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

Referring now to the accompanying drawings, there is shown a preferred embodiment of the invention.

Figure 1:
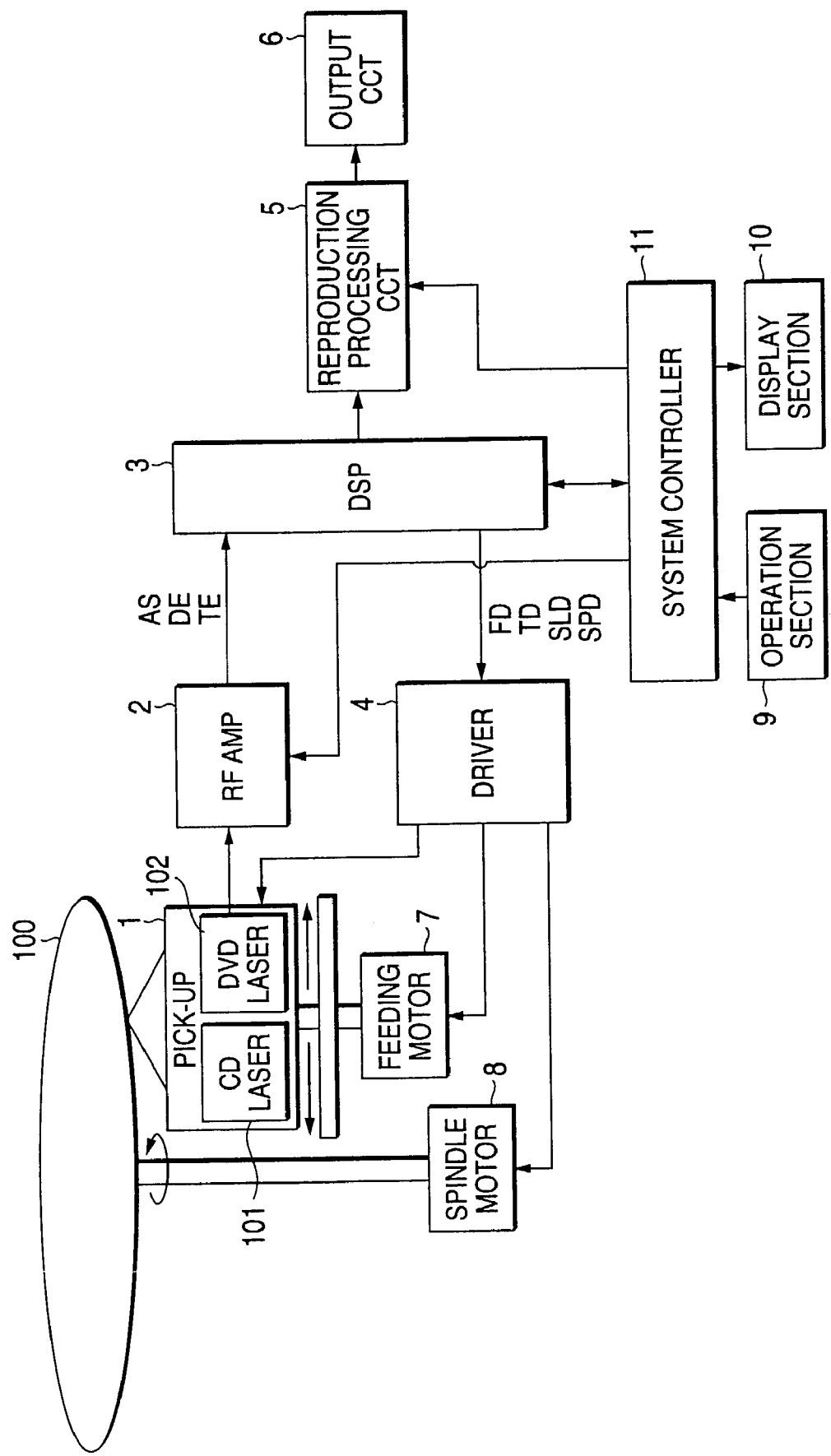
FIG. 1 is a block diagram of a disk reproducing apparatus according to an embodiment of the invention.

FIG. 1 is a block diagram of a disk reproducing apparatus according to an embodiment of the invention. A pick-up 1 includes a CD laser 11, which is a laser for reproducing a CD standard disk, and a DVD laser 12, which is a laser for reproducing a DVD standard disk. By irradiating a disk 100 to be reproduced with a beam in such a manner that when the disk 100 is the CD standard disk, the CD laser 11 is turned on, whereas if the disk 100 is the DVD standard disk, the DVD laser 12 is turned on, a reflection light is taken from the disk 100. The reflection light is converted into an electric signal, thereby reading the information recorded on the disk 100. The wavelength of the beam output from the CD laser 11 is set at 780 nm and the wavelength of the beam output from the DVD laser 12 is set at 650 nm.

Although not shown, the pick-up 1 includes an optical system having a lens and other optical devices, a focusing actuator for moving the spot of the beam applied to the disk in a focusing direction (vertical to the recording face of the disk 100) using the optical system, and a tracking actuator for moving the spot of the beam applied to the disk in a tracking direction (radial direction of the disk 100) using the optical system.

The disk reproducing apparatus according to the embodiment includes a circuit (not shown) for detecting that the disk, which is removable, has been loaded, and informing the loading of the disk to a system controller 11 of this fact. The system controller 11, when the loading of the disk 100 is informed, identifies the type of the disk 100 as described later.

An RF amplifier 2 amplifies the signal (hereinafter referred to as "RF signal") read by the pick-up 1 and creates, from the amplified RF signal, a plurality of signals such as a full-added signal AS, a focusing error signal FE and a tracking error signal TE. The RF amplifier 2 supplies these signals to a DSP (Digital Signal Processor) 3.

The RF signal is composed of a plurality of signals. The low frequency component of a sum of these signals is a full-added signal AS. The focusing error signal FE is a signal indicative of a deviation of a beam spot applied to the disk 100 from the recording face of the disk 100. The tracking error signal TE is a signal indicative of a deviation of the beam spot applied to the disk 100 from a track of the disk 100.

The DSP 3 converts the focusing error signal FE and the tracking error signal TE, which are supplied from the RF amplifier 2, into digital signals, and on the basis of the converted digital signals, creates a focusing driving signal FD for causing the beam spot applied onto the disk 100 to follow the recording face of the disk 100, a tracking driving signal TD for causing the beam spot applied onto the disk 100 to follow the track of the disk 100 and a feeding motor driving signal SLD, which are in turn supplied to a driver 4.

The DSP 3 also converts the RF signal into a digital signal, and subjects the converted digital signal to demodulation processing and error detection/correction processing corresponding to the disk to be reproduced, and supplies the processed digital signal to a reproduction processing circuit 5. Further, the DSP 3 creates a spindle motor driving signal SPD for setting the revolving speed of the disk 100 at a target value, and supplies the spindle motor driving signal SPD to the driver 4. Moreover, the DSP 3 converts the full-added signal AD and focusing error signal FE supplied from the RF amplifier 2 into the corresponding digital signals, which are in turn supplied to the system controller 11.

On the basis of the focusing driving signal FD, tracking driving signal TD, feeding motor driving signal SLD and spindle motor driving signal SPD, which have been supplied from the DSP 3, the driver 4 drives a focusing actuator, tracking actuator, feeding motor 7 and a spindle motor 8, which are arranged within the pick-up 1.

The reproduction processing circuit 5 applies a demolition processing corresponding to the type of the disk to the signal supplied from the DSP 3 and reproduces the information. The information reproduced by the reproduction processing circuit 5 is outputted from an output circuit 6. The feeding motor 7 is a motor for feeding the pick-up 1 in a radial direction of the disk 100. The spindle motor 8 is a motor for rotating the disk 100.

An operation section 9 is employed for a user to input various commands to the disk reproducing apparatus. The command inputted to the disk reproducing apparatus by the user is received by the system controller 11. Under the control by the system controller 11, a display section 10 displays information such as a time, information representative of the operating state of the disk reproducing apparatus, information corresponding to the data being reproduced (e.g. title of the music which is being reproduced). The system controller 11, which may be a microcomputer, controls the components of the disk reproducing apparatus in accordance with the command inputted by the user.

Figure 2:
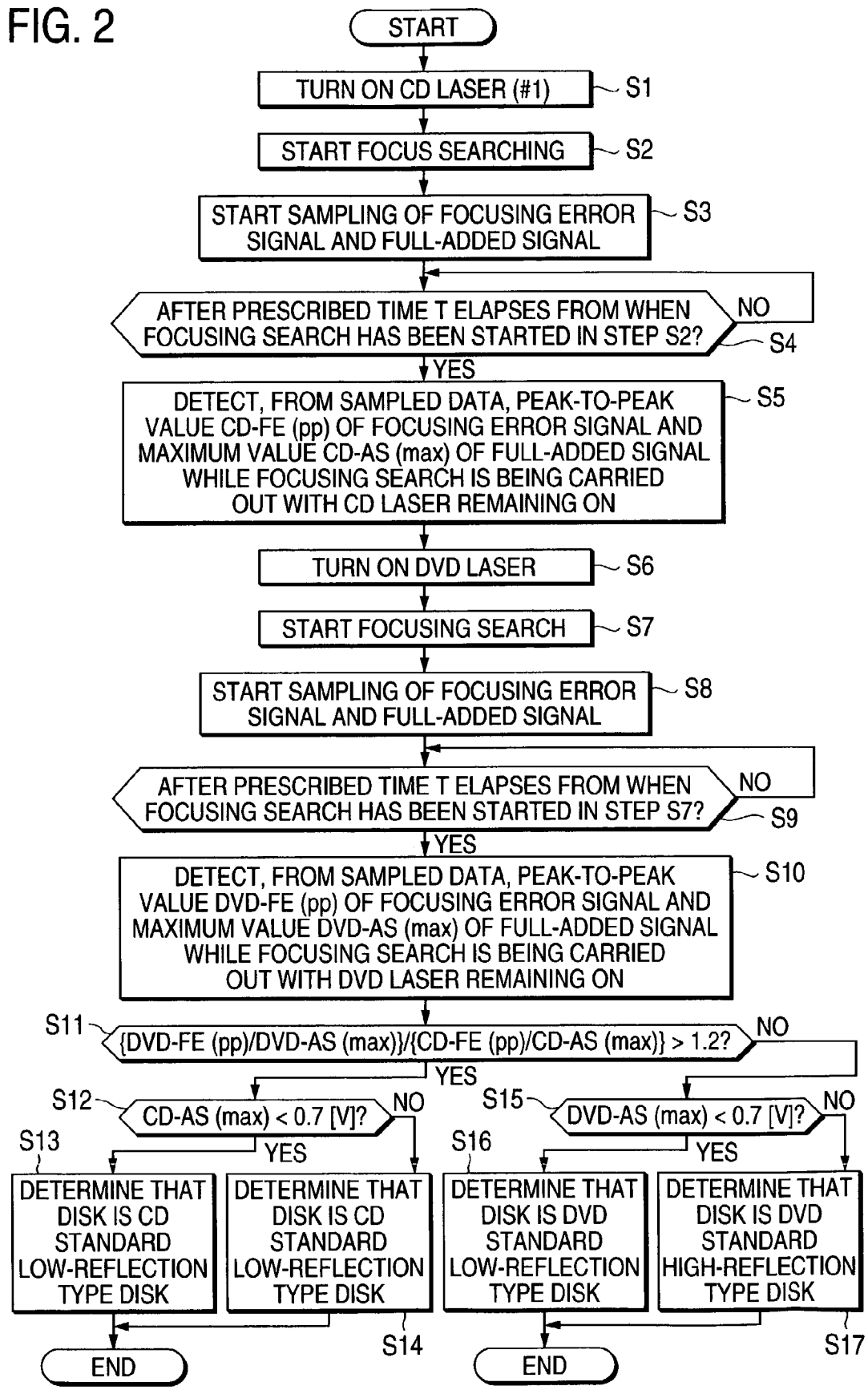
FIG. 2 is a flowchart of the operation carried out by a system controller in order to identify a type of a disk in the disk reproducing apparatus shown in FIG. 1.

Referring to the flowchart of FIG. 2, an explanation will be given of the operation performed by the system controller 11 in order to identify the type of the disk 100. First, only the CD laser 11 within the pick-up 1 is turned on (S1). Next, the focusing search of moving the beam spot applied to the disk 100 is started (S2). Next, sampling of the focusing error signal and the full-added signal is started (S3).

After a prescribed time elapses from when the focusing search has been started in step S2 (Yes in step S4), the system controller 11 stops sampling of the focusing error signal and full-added signal to detect, from the sampled data, a difference (hereinafter referred to as "peak-to-peak value") between the maximum value and the minimum value of the focusing error and the maximum value of the full-added signal while the focusing search started in step S2 is being carried out (S5). Hereinafter, the peak-to-peak value of the focusing error signal is referred to as CD-FE(pp) and the maximum value of the full-added signal is referred to as CD-AS(max).

The prescribed time T in steps S4 and S9 described later is set at a time not shorter than the time taken for the beam spot applied to the disk 100 to move over an entire movable region in a focusing direction when the focusing search is performed.

Next, the CD laser 11 within the pick-up 1 is turned off and the DVD laser 12 within the pick-up 1 is turned on. Next, the focusing search of moving the beam spot applied to the disk 100 is started (S7). Next, sampling of the focusing error signal and the full-added signal is started (S8).

After a prescribed time elapses from when the focusing search has been started in step S7 ("Yes" in step S9), the system controller 11 stops sampling of the focusing error and full-added signal to detect, from the sampled data, a difference ("peak-to-peak value") between the maximum value and the minimum value of the focusing error and the maximum value of the full-added signal while the focusing search started in step S7 is being carried out (S10). Hereinafter, the peak-to-peak value of the focusing error signal is referred to as DVD-FE(pp) and the maximum value of the full-added signal is referred to as DVD-AS(max).

Next, a value {{DVD-FE(pp)/DVD-AS(max)}/{CD-FE(pp)/CD-AS(max)}}, which is a value when the value obtained by dividing DVD-FE(pp) by DVD-AS(max) is divided by the value obtained by dividing CD-FE(pp) by CD-AS(max), is computed and is determined whether or not the value {{DVD-FE(pp)/DVD-AS(max)}/{CD-FE(pp)/CD-AS(max)}} is larger than a threshold value (S11). Incidentally, in the embodiment, the threshold value in step S11 is set at "1.2". However, the threshold value in step S11 should not be limited to the value in the embodiment, and may be set at an optimum value according to various conditions.

If the value {{DVD-FE(pp)/DVD-AS(max)}/{CD-FE(pp)/CD-AS(max)}} is larger than the threshold value ("Yes" in step S11), it is determined that the disk 100 is of the CD standard disk. Further, it is determined whether or not CD-AS(max) is smaller than the threshold value (S12). Incidentally, in the embodiment, the threshold value in step S12 is set at "0.7 V". The threshold value in step S11 should not be limited to the value in the embodiment, and may be set at an optimum value according to various conditions.

If CD-AS(max) is smaller than the threshold value ("Yes" in step S12), it is determined that the disk 100 is of a CD standard low-reflection type disk (specifically, a disk such as CD-ROM and CD-R) (S13). On the other hand, if CD-AS(max) is not smaller than the threshold value ("No" in step S12), it is determined that the disk 100 is of a CD standard high-reflection type disk (specifically, a disk such as CD-RW) (S14).

If the value {{DVD-FE(pp)/DVD-AS(max)}/{CD-FE(pp)/CD-AS(max)}} is not larger than the threshold value ("No" in step S11), it is determined that the disk 100 is of the DVD standard disk. Further, it is determined whether or not DVD-AS(max) is smaller than the threshold value (S15). Incidentally, in the embodiment, the threshold value in step. S12 is set at "0.7 V". The threshold value in step S15 should not be limited to the value in the embodiment, and may be set at an optimum value according to various conditions.

If the DVD-AS(max) is smaller than the threshold value ("Yes" in S15), it is determined that the disk 100 is of a DVD standard low-reflection type disk (specifically, a disk such as a two-layered type DVD) (S16). On the other hand, if DVD-AS(max) is not smaller than the threshold value ("Yes" in step S15), it is determined that the disk 100 is of a DVD standard high-reflection type disk (specifically, a disk such as a single-layered type DVD) (S17).

As described above, in the embodiment, on the basis of a ratio between the ratio of the value (specifically, the peak-to-peak value) corresponding to the amplitude of the focusing error signal to the value (specifically, the maximum value) corresponding to the amplitude of the full-added signal while the focusing search is carried out by turning on the CD laser 11, and the ratio of the value corresponding to the amplitude of the focusing error signal to the value corresponding to the amplitude of the full-added signal while the focusing search is carried out by turning on the DVD laser 12, it is determined whether the disk 100 is the CD standard disk or the DVD standard disk.

After having determined whether the disk is of the CD standard or of the DVD standard, further determination will be made. Specifically, when it is determined that the disk is of the CD standard, on the basis of the amplitude of the full-added signal while the focusing search is carried out by turning on the CD laser 11, it is determined whether the disk is of the low-reflection type disk or of the high-reflection type disk. On the other hand, when it is determined that the disk is of the DVD standard, on the basis of the amplitude of the full-added signal while the focusing search is carried out by turning on the DVD laser 12, it is determined whether the disk is the low-reflection type disk or the high-reflection type disk.

According to the above determination, after the type of the disk 100 to be reproduced has been identified, according to the type of the disk 100, the system controller 11 sets various kinds of parameters such as a method of creating the tracking error signal, error level and the operation of a decoder. Thus, the reproducing operation suitable for the type of the disk 100 can be carried out to reproduce the information recorded on the disk 100.

Figure 3A:
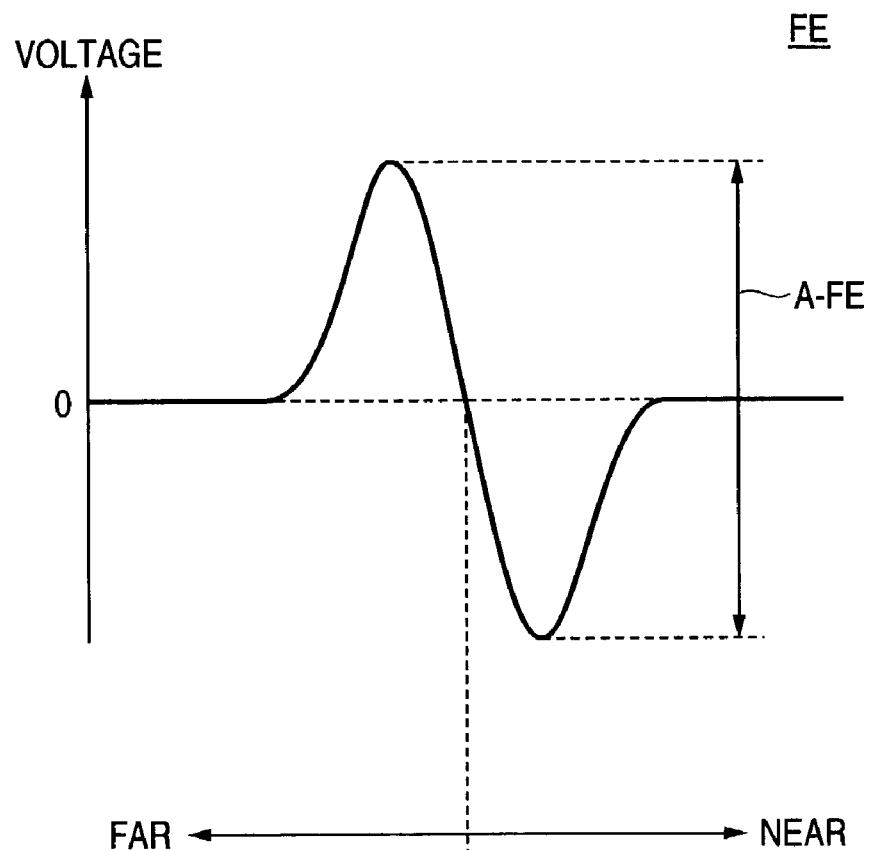
FIGS. 3A and 3B are graphs showing the waveforms of a focusing error and a full-added signal.
Figure 3B:
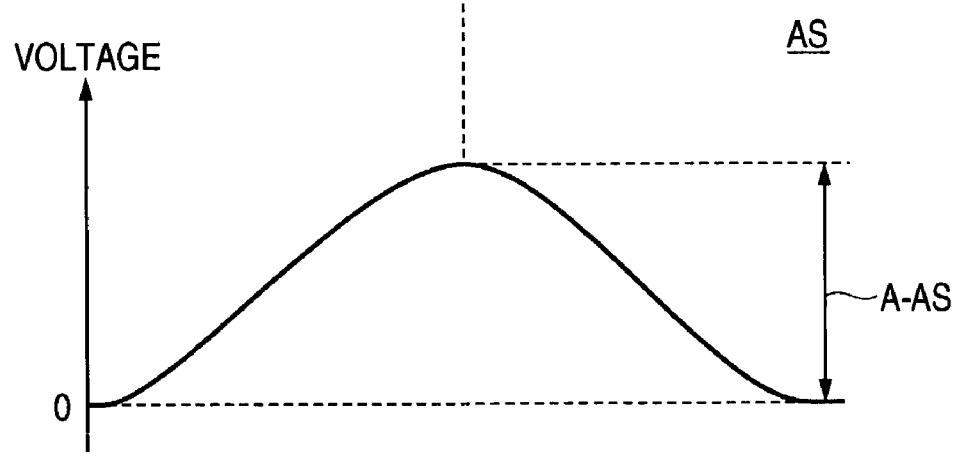

Now, it should be noted that the focusing error signal FE varies as shown in FIG. 3A according to the position of the beam spot applied to the disk 100 relative to the recording face of the disk 100. Specifically, when the beam spot applied to the disk 100 coincides with the recording face of the disk 100 is at the position (hereinafter referred to as "focusing position"), the focusing error signal FE is 0 (zero). When the beam spot is in the vicinity of the focusing position, as an objective lens becomes far from the disk, the absolute value of the focusing error FE becomes large with a positive polarity, whereas as an objective lens becomes near to the disk, the absolute value of the focusing error FE becomes large with a negative polarity. However, it should be noted that if the beam spot is not in the vicinity of the focusing position, as the objective lens becomes far from the disk or near to the disk, the absolute value becomes small, eventually 0 (zero). As shown in FIG. 3B, the full-added signal AS becomes maximum at the focusing position.

If comparison is made between the case where the CD standard disk is subjected to the focus searching by application of the beam output from the CD laser 11 and the case where the DVD standard disk is subjected to the focus searching by application of the beam output from the CD laser 11, the amplitude A-FE of the focusing error signal FE and the amplitude A-AS of the full-added signal AS, as illustrated in FIGS. 3A and 3B, in the former are larger than in the latter.

If comparison is made between the case where the DVD standard disk is subjected to the focus searching by application of the beam output from the DVD laser 12 and the case where the CD standard disk is subjected to the focus searching by application of the beam output from the DVD laser 12, the amplitude A-FE of the focusing error signal FE and the amplitude A-AS of the full-added signal AS, as illustrated in FIGS. 3A and 3B, in the former are larger than in the latter.

Therefore, theoretically, it is possible to determine whether the disk 100 is the CD standard disk or the DVD standard disk on the basis of either one of the amplitude of the focusing error signal and the amplitude of the full-added signal AS when the focusing search is carried out by application of the beam to the disk 100 by turning on either one of the CD laser 11 and the DVD laser 12.

However, actually, since the reflectance of the disk and the laser power have various values, the method that is based on either one of the amplitude of the focusing error signal and the amplitude of the full-added signal AS cannot accurately discriminate the CD standard disk and the DVD standard disk from each other.

On the contrary, in accordance with the embodiment, the type of the disk is identified on the basis of the ratio (hereinafter referred to as "FE·AS ratio") of the value (specifically, the peak-to-peak value) corresponding to the amplitude of the focusing error signal to the value (specifically, the maximum value) corresponding to the full-added signal while the focusing search is carried out. For this reason, regardless of the variation in the reflectance of the disk and the laser power, the CD standard disk and the DVD standard disk can be accurately discriminated from each other.

Further, in the embodiment, since the type of the disk is identified on the basis of the ratio between the FE·AS ratio when the CD laser is turned on and the FE·AS ratio when the DVD laser is turned on, even if there is a variation in the circuit characteristic for creating the focusing error and in the circuit characteristic for creating the full-added signal, regardless of the variation, the CD standard disk and the DVD standard disk can be discriminated more accurately from each other.

Further, in the embodiment, in order to identify the type of the disk, only two kinds of signals of the focusing error signal and the full-added signal are employed so that the type of the disk can be identified quickly and easily.

Additionally, in the embodiment, in order to identify the type of the disk, after the focusing search by the CD laser has been carried out, the focusing search by the DVD laser is carried out. However, after the focusing search by the DVD laser has been carried out, the focusing search by the CD laser may be carried out.

Further, in the embodiment, the type of the disk is identified on the basis of the peak-to-peak value of the focusing error signal and the maximum value of the full-added signal while the focusing search is carried out. However, the type of the disk has only to be identified on the basis of the value corresponding to the amplitude of the focusing error signal and the value corresponding to the amplitude of the full-added signal. For example, the type of the disk can be identified on the basis of the maximum value of the focusing error signal and the average value of the full-added signal while the focusing search is carried out.

As described above, in accordance with the invention, the type of the disk can be identified on the basis of between a ratio between the ratio of the value (the peak-to-peak value in the embodiment) corresponding to the amplitude of the focusing error signal to the value (the maximum value in the embodiment) corresponding to the amplitude of the full-added signal while the focusing search is carried out by turning on the CD laser, and the ratio of the value corresponding to the amplitude of the focusing error signal to the value corresponding to the amplitude of the full-added signal while the focusing search is carried out by turning on the DVD laser. For this reason, the type of the disk can be identified accurately, quickly and easily.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A disk reproducing apparatus for reproducing information recorded in a disk, which is a disc-shaped recording medium, comprising:

a first laser source adapted to output a first laser beam for reproducing a disk of a first standard;

a second laser source adapted to output a second laser beam for reproducing a disk of a second standard;

a optical pick-up adapted to apply the first laser beam to the disk by turning on the first laser source when the disk is of the first standard disk, and to apply the second laser beam to the disk by turning on the second laser source if the disk is of the second standard, and to convert a reflected light acquired from the disk into an electric signal to read information recorded in the disk;

a focusing error signal creating section adapted to create, on the basis of the electric signal, a focusing error signal indicative of a deviation of a beam spot applied to the disk from a recording face of the disk;

a full-added signal creating section adapted to create a full-added signal which is a low frequency component of a signal obtained by adding all the electric signals acquired by the optical pick-up;

a focus searching section adapted to carry out focusing search of moving the beam spot applied to the disk from the pick-up in a direction vertical to the recording face of the disk;

a first detecting section adapted to detect a difference CD-FE(pp) between the maximum value and minimum value of the focusing error signal, and a maximum value CD-AS(max) of the full-added signal, when the focusing search is carried out with the first laser beam;

a second detecting section adapted to detect a difference DVD-FE(pp) between the maximum value and minimum value of the focusing error signal, and a maximum value DVD-AS(max) of the full-added signal, when the focusing search is carried out with the first laser beam;

a computing section adapted to compute a value {{DVD-FE(pp)/DVD-AS(max)}/{CD-FE(pp)/CD-AS(max)}}, which is a value obtained when the value obtained by dividing DVD-FE(pp) by DVD-AS(max) is divided by the value obtained by dividing CD-FE(pp) by CD-AS (max);

a first determining section adapted to determine whether the disk is of the first standard or of the second standard according to whether or not the value {{DVD-FE(pp)/

DVD-AS(max)}/{CD-FE(pp)/CD-AS(max)}} is larger than a first threshold value;
a second determining section adapted to determine, when the disk is determined to be of the first standard, whether the disk is a high reflection disk or a low reflection disk according to whether the value CD-AS (max) is larger than a second threshold value; and
a third determining section adapted to determine, when the disk is determined to be of the second standard, whether the disk is a high reflection disk or a low reflection disk according to whether the value DVD-AS(max) is larger than a third threshold value.

2. The apparatus as claimed in claim 1, wherein the disk of the first standard comprises a disk of a CD standard, and the disk of the second standard comprises a disk of a DVD standard.

3. A method of identifying the type of a disk, which is a disc-shaped recording medium, comprising:
carrying out a focusing search, which an operation to move a beam spot applied to the disk in a direction vertical to the recording face of the disk, with a first laser beam for reproducing a disk of a first standard, and detecting a value CD-FE corresponding to an amplitude of a focusing error signal indicative of a deviation of the beam spot from the reproducing face of the disk, and a value CD-AS corresponding to an amplitude of a full-added signal, which is a low frequency component of a signal obtained by adding all electric signals acquired by an optical pick-up;
carrying out the focusing search with a second laser beam for reproducing a disk of a second standard, and detecting a value DVD-FE corresponding to the amplitude of the focusing error signal, and a value DVD-AS corresponding to the amplitude of the full-added signal;
computing a CD-FE·AS ratio which is a ratio between the value CD-FE and the value CD-AS, a DVD-FE·AS ratio which is a ratio between the value DVD-FE and the value DVD-AS, and a CD·DVD-FE·AS ratio which is a ratio between the CD-FE·AS ratio and the DVD-FE·AS ratio; and
discriminating whether the disk is of the first standard or of the second standard on the basis of the CD·DVD-FE·AS ratio.

4. The method as claimed in claim 3, wherein the value CD-FE is a difference between the maximum value and the minimum value of the focusing error signal while the focusing search is carried out with the first laser beam, and the value CD-AS is a maximum value of the full-added signal while the focusing search is carried out with the first laser beam,
wherein the value DVD-FE is a difference between the maximum value and minimum value of the focusing error signal while the focusing search is carried out with the second laser beam, and the value DVD-AS is a maximum value of the full-added signal while the focusing search is carried out with the second laser beam.

5. The method as claimed in claim 3, further comprising:
discriminating, when the disk is identified to be of the first standard, whether the disk is a high reflection type disk or a low reflection type disk on the basis of the value CD-AS; and
discriminating, when the disk is identified to be of the second standard, whether the disk is a high reflection type disk or a low reflection type disk on the basis of the value DVD-AS.

6. The method as claimed in claim 3, wherein the disk of the first standard comprises a disk of a CD standard, and the disk of the second standard comprises a disk of a DVD standard.

* * * * *